United States Patent
Cooper et al.

(10) Patent No.: US 9,894,142 B2
(45) Date of Patent: Feb. 13, 2018

(54) METHODS, DEVICES, AND COMPUTER PROGRAM PRODUCTS FOR PROVIDING A PLURALITY OF APPLICATION SERVICES VIA A CUSTOMIZED PRIVATE NETWORK CONNECTION

(71) Applicant: AT&T Intellectual Property I, L.P., Atlanta, GA (US)

(72) Inventors: Christopher Cooper, Acworth, GA (US); Alfonso Jones, Suwanee, GA (US); Steven McDonald, Locust Grove, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 451 days.

(21) Appl. No.: 13/942,151

(22) Filed: Jul. 15, 2013

(65) Prior Publication Data
US 2013/0304853 A1 Nov. 14, 2013

Related U.S. Application Data

(63) Continuation of application No. 12/948,922, filed on Nov. 18, 2010, now Pat. No. 8,488,575.

(51) Int. Cl.
*H04L 29/08* (2006.01)
*G06F 9/50* (2006.01)
*H04L 29/06* (2006.01)

(52) U.S. Cl.
CPC ............ *H04L 67/10* (2013.01); *G06F 9/5055* (2013.01); *G06F 2209/5013* (2013.01); *H04L 69/22* (2013.01)

(58) Field of Classification Search
CPC ....... H04L 67/10; H04L 69/22; G06F 9/5055; G06F 2209/5013
See application file for complete search history.

(56) References Cited

U.S. PATENT DOCUMENTS

| | | | |
|---|---|---|---|
| 2002/0120763 A1* | 8/2002 | Miloushev et al. .......... 709/230 |
| 2007/0110046 A1* | 5/2007 | Farrell .................... H04L 69/04 370/389 |
| 2008/0095119 A1* | 4/2008 | Bachmann et al. .......... 370/332 |
| 2008/0285492 A1 | 11/2008 | Vesterinen |
| 2009/0023426 A1 | 1/2009 | Shatzkamer et al. |
| 2010/0228839 A1 | 9/2010 | Pal et al. |
| 2010/0268803 A1 | 10/2010 | Calippee et al. |
| 2010/0281149 A1 | 11/2010 | Lin et al. |
| 2010/0329239 A1* | 12/2010 | Compienne ............. G06F 9/546 370/352 |
| 2011/0060845 A1* | 3/2011 | Jungck .......................... 709/245 |

(Continued)

*Primary Examiner* — Walter Divito
*Assistant Examiner* — Anthony Luo
(74) *Attorney, Agent, or Firm* — Hartman & Citrin LLC

(57) ABSTRACT

A plurality of application services are provided to subscriber devices in a cloud computing network. A plurality of requests for application services are received from a subscriber device via a customized private network connection assigned to the subscriber device, and the requests for application services are aggregated with requests for application services from other subscriber devices. The requests are transmitted to application servers within the cloud computing network hosting applications for performing the application services. The subscriber device is provided with the requested plurality of application services via the customized private network connection.

20 Claims, 5 Drawing Sheets

(56) References Cited

U.S. PATENT DOCUMENTS

2011/0131306 A1* 6/2011 Ferris .................... G06F 9/5072
                                                    709/223
2011/0246586 A1* 10/2011 Steele .......................... 709/206
2011/0252146 A1  10/2011 Santamaria et al.
2011/0276951 A1* 11/2011 Jain .............................. 717/140
2012/0066018 A1*  3/2012 Piersol ........................ 705/7.14

* cited by examiner

METHODS, DEVICES, AND COMPUTER PROGRAM PRODUCTS FOR PROVIDING A PLURALITY OF APPLICATION SERVICES VIA A CUSTOMIZED PRIVATE NETWORK CONNECTION

CROSS-REFERENCE TO RELATED APPLICATION

This application is a continuation of and claims priority to U.S. patent application Ser. No. 12/948,922, filed Nov. 18, 2010, now U.S. Pat. No. 8,488,575.

TECHNICAL FIELD

The present disclosure relates generally to telecommunications, and, more particularly, to providing application services.

BACKGROUND

An Access Point Name (APN) is a data structure that typically identifies an Internet Protocol (IP) packet data network (PDN) that a communication device wants to communicate with. In addition to identifying a PDN, an APN is also typically used to define a type of service that is provided by the PDN. For example, an APN may be used in a 3GPP data access network, e.g., general packet radio service (GPRS) or evolved packet core (EPC), to identify a connection to an IP Multimedia Subsystem (IMS), a messaging service center (e.g., a Multimedia Messaging Service Center (MMSC)), a wireless application protocol server (WAP), the Internet, a company intranet, an application server, or another device, node, and/or service.

In addition to the PDN from which to provide the user's IP address, an APN is also typically used to select a Gateway GPRS Support Node (GGSN) from which the PDN is accessible. The GGSN provides connectivity between one or more PDNs and the operator's packet domain network. In general, a user accesses a PDN via a GGSN, which may be located in a visited operator's network or may be located in the user's home operator's network. In some circumstances, inter-operator networks provide IP connectivity between operators' packet domain networks.

APN resolution is the process of Domain Name System (DNS) lookup to determine the IP address of the GGSN that provides connectivity to the PDN identified by the APN. When a GPRS communication device sets up a data connection, it provides the APN to which it wants to connect to. APN resolution is then used to select the GGSN and provide an IP address of the GGSN which should serve as the access point. At this point, a packet data protocol (PDP) context can be activated to provide a packet data connection.

An APN may be public or private. A public APN is used for a connection over the public Internet, whereas a private APN is used for a dedicated private connection. Private network connections may be used to provide subscribers with application services via a cloud computing network.

Currently, each private APN is dedicated to providing one application service for a subscriber device. As the number of application services desired by subscribers grows, the number of private APNs needed to provide the application services becomes harder to manage and implement.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to one embodiment, a method for providing a plurality of application services in a cloud computing network comprises receiving requests for a plurality of application services from at least one subscriber device via a customized private network connection assigned to the subscriber device, aggregating the requests for application services with requests for application services from other subscriber devices, and transmitting the aggregated requests to application servers within the cloud computing network hosting applications for providing the application services. The subscriber device is provided with the requested plurality of application services performed by the application servers via the customized private network connection.

According to another embodiment, a device for providing a plurality of application services in a cloud computing network includes an interface for receiving requests for a plurality of application services from at least one subscriber device via a customized private network connection assigned to the subscriber device and a processor for aggregating the requests for application services from the at least one subscriber device with requests for application services from other subscriber devices. The processor transmits the aggregated requests for application services, via the interface, to application servers within the cloud computing network hosting applications for providing the application services and provides the subscriber device with the requested plurality of application services performed by the application servers via the customized private network connection.

According to another embodiment, a non-transitory computer program product includes a storage medium upon which instructions are recorded that, when executed by a processor, perform a method for providing a plurality of application services in a cloud computing network. The method includes receiving requests for a plurality of application services from at least one subscriber device via a customized private network connection assigned to the subscriber device, aggregating the requests for application services with requests for application services from other subscriber devices, and transmitting the aggregated requests for application services to application servers within the cloud computing network hosting applications for providing the application services. The subscriber device is provided with the requested plurality of application services performed by the application servers via the customized private network connection.

DETAILED DESCRIPTION

Detailed exemplary embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

The embodiments described herein may be implemented in wireless networks that use exemplary telecommunications standards, such as Global System for Mobile communications (GSM) and a Universal Mobile Telecommunications System (UMTS). It should be understood, however, that the systems and methods may be implemented in wireless networks that use any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

Figure 1:
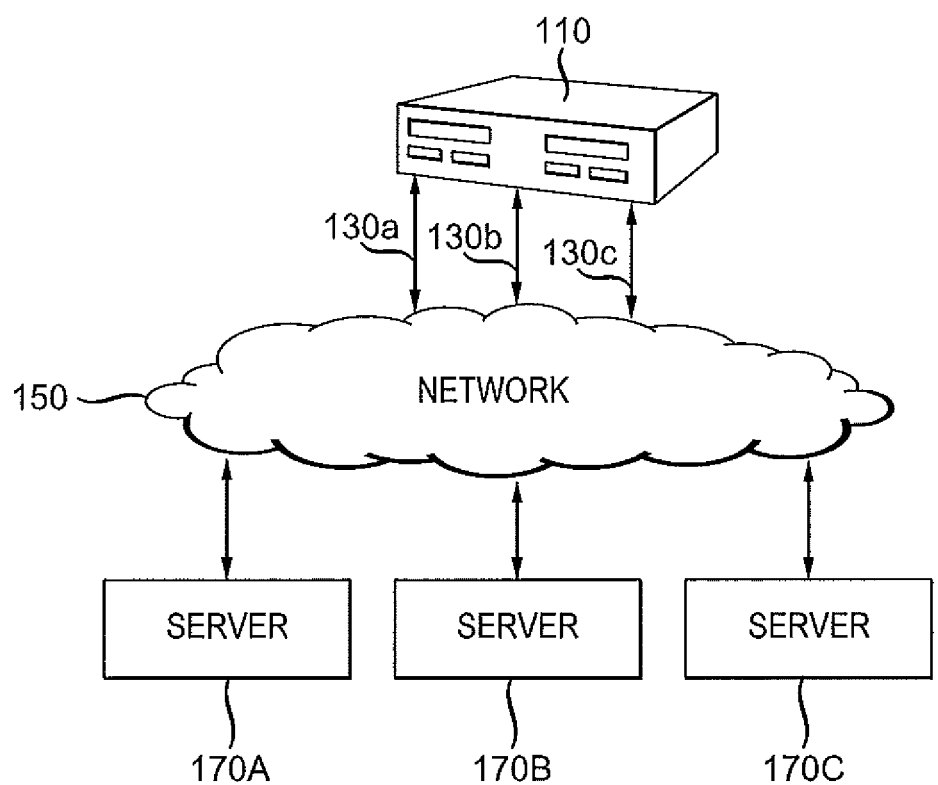
FIG. 1 illustrates a conventional system for providing a plurality of application services via a plurality of private network connections.

FIG. 1 illustrates a conventional system for providing a plurality of application services via a plurality of private network connections. Referring to FIG. 1, a subscriber device 110 is connected to a wireless network 150 via multiple private network connections 130a, 130b, and 130c. The wireless network 150 passes requests from the subscriber device 110 to and from servers 170a, 170b, and 170c.

In the system shown in FIG. 1, each private APN connection provides a different application service for the subscriber device 110. In this scenario, the subscriber device 110 is assigned multiple APNs associated with different private Internet network connections 130a, 130b, and 130c that point to specific applications hosted by application servers 170a, 170b, and 170c, respectively.

An example of a subscriber device 110 may be a communication device included in a vending machine. In this example, the subscriber device 110 may be assigned a first APN, e.g., 130a, that points to a fleet tracking application hosted by the server 170a, a second APN, e.g., APN 130b, that points to a field force automation application hosted by a server 170b, and a third APN, e.g., APN 130c, that points to a payment application hosted by the server 170c. In this scenario, a subscriber would have to pay for three different setups and APN connections, and three separate work orders would need to be fulfilled.

According to an exemplary embodiment, subscribers are provided with the ability to create a customized private network connection to a centralized hosted location, e.g., an aggregator, and distribute application specific data to the applicable applications hosted by servers. In contrast to having multiple APNs that point to specific applications, according to an exemplary embodiment, a subscriber device connected via a single customized private APN connection is able to route traffic to a plurality of applications hosted by various application servers within a cloud computing network. No hardware needs to be swapped for adding or modifying applications, and the APN may remain the same for all applications. This allows the subscriber (or an authorized user) to switch applications with minimal work for the subscriber and the network teams. Additional benefits provided to the subscriber include the ability to turn application services on and off at will, seamless integration with wireline and wireless services, a reduction in the time needed to add or modify application services provided to a subscriber, and the ability to self-provision applications. Benefits provided to the network include a reduction in network resources needed to provide multiple application services.

Figures 2, 3:
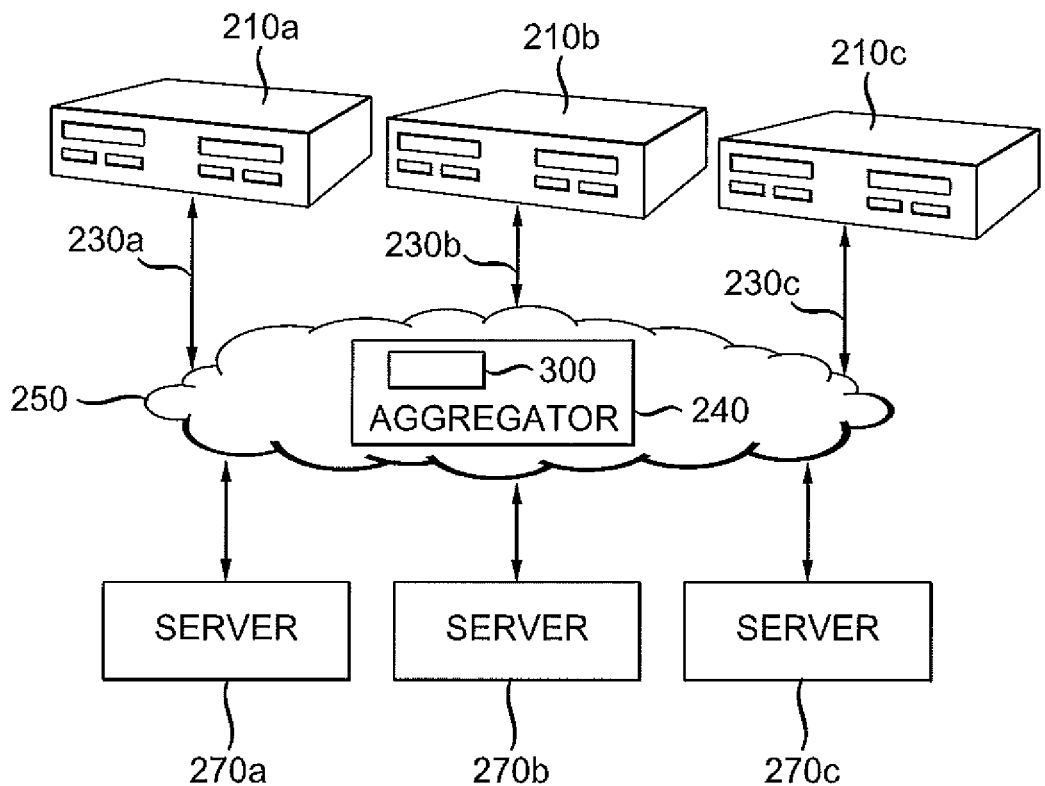
FIG. 2 illustrates a system for providing a plurality of application services via a single customized private network connection.
FIG. 3 illustrates an exemplary subscriber device application profile according to an exemplary embodiment.

FIG. 2 illustrates a system for providing a plurality of application services in a cloud computing network according to an exemplary embodiment. Each of the subscriber devices 210a, 210b, and 210c is connected via customized private network connections 230a, 230b, and 230c, respectively, to a data aggregator 240 via a wireless network 250. The data aggregator 240, in turn, is connected to servers 270a, 270b, and 270c which may be part of a cloud computing network.

Figure 4:
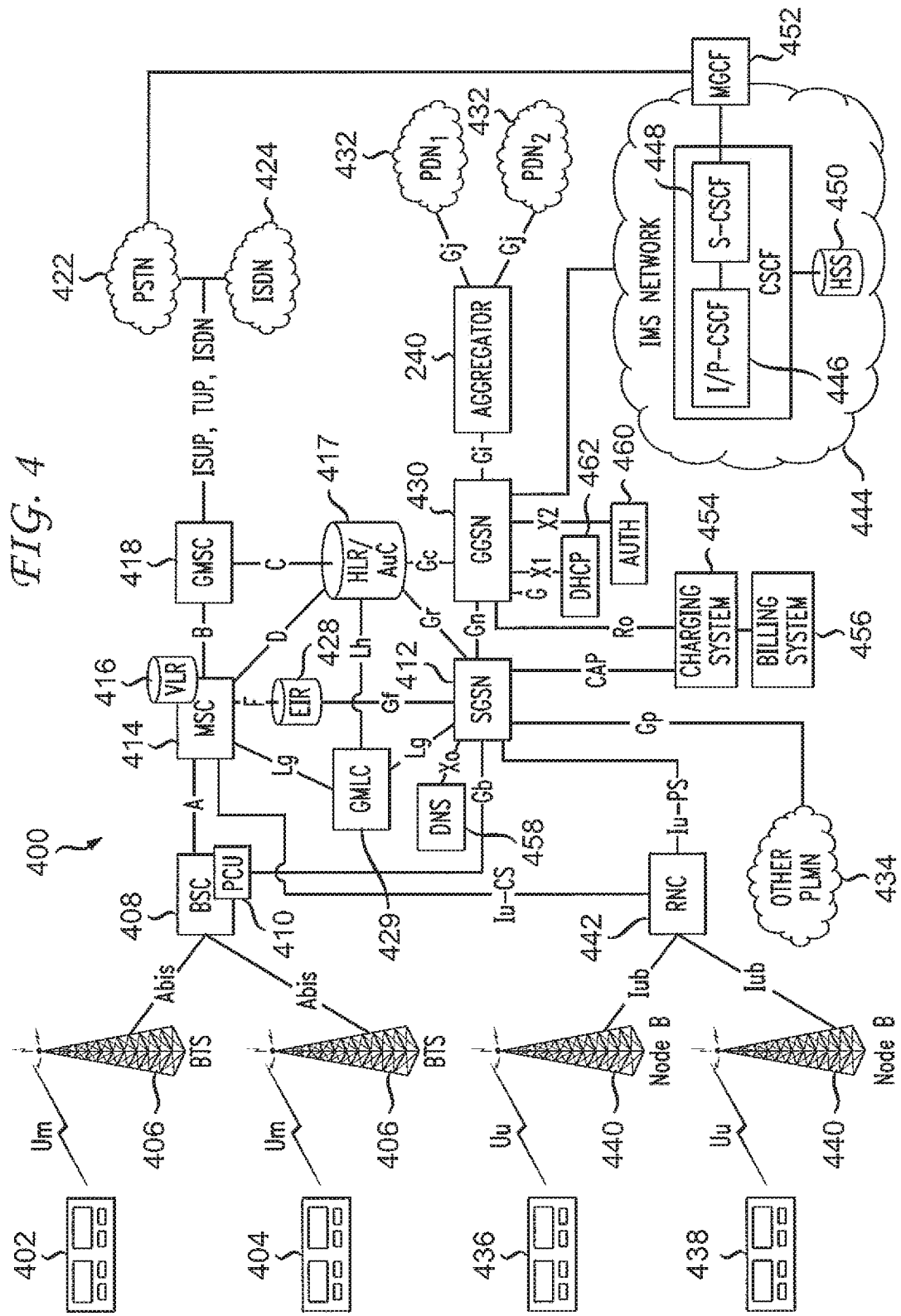
FIG. 4 illustrates a wireless network in which exemplary embodiments may be implemented.

The subscriber devices 210a, 210b, and 210c may each be a communication device that includes a Subscriber Identity Modules (SIM), Universal SIMs (USIM), or Universal Integrated Circuit Card (UICC) that contains subscriber information to enable network access to a wireless telecommunications network, such as that depicted in FIG. 4. Examples of the subscriber device 110 may include a mobile communication device, such as a cellular telephone, or a stationary communication device including a modem.

The network 250 may include a wireless Internet network, a wired Internet network, or a combination of both. The customized private network connections 230a, 230b, and 230c may be implemented with wireless connections through a wireless network, such as the network 250. An example of a wireless network is described in further detail below with reference to FIG. 4.

Requests from the subscriber devices 210a, 210b, and 210c each include an APN identifying the customized private network connection to the data aggregator 240. Thus, in contrast to the conventional system shown in FIG. 1, according to exemplary embodiment, the APNs point to the data aggregator 240 rather than to particular servers. The requests also include a destination internet protocol address for each of the application servers 270a, 270b, and 270c hosting the applications for providing the application services. The destination Internet protocol addresses may be included in the headers of the requests.

The data aggregator 240 includes subscriber application profiles 300 for each of the subscriber devices 210a, 210b, and 210c. The subscriber application profiles 300 each contain applications desired by the subscribers and destination internet protocol addresses for the servers 270a, 270b, and 270e hosting the various applications for performing the application services. Upon receipt of requests from the subscriber devices 210a, 210b, and 210c, the data aggregator 240 determines the destination IP addresses of the servers providing the requested application services, e.g., by examining the headers of the requests from the subscriber devices 210a, 210b, and 210c. The data aggregator 240 aggregates requests from the various subscriber devices 210a, 210b, and 210c based on the destination IP addresses included in the requests and transmits the aggregated requests to the appropriate application host servers 270a, 270b, and 270c for fulfilling the application service requests. Thus, requests from the subscriber devices 210a, 210b, and 210c for application services hosted by the server 270a are aggregated and sent to the server 270a, requests from the subscriber devices 210a, 210b, and 210c for application services hosted by the server 270b are aggregated and sent to the server 270b, and so on. The data aggregator 240 may be implemented as described in more detail below with reference to FIG. 7.

The servers 270a, 270b, and 270c accept the requests and perform the application services, and the application services are provided to the subscriber devices 210a, 210b, and 210c via the network 250 and the customized private network connections 230a, 230b, and 230c, respectively. Although shown as discrete devices for ease of illustration, the servers 270a, 270b, and 270c may be integrated within one or more devices within the cloud computing network 250.

Although three subscriber devices 210a, 210b, and 210c and three servers 270a, 270b, and 270c are shown for ease of illustrations, it should be appreciated that any number of subscriber devices may be implemented.

FIG. 3 illustrates an example of a subscriber application profile 300 according to an exemplary embodiment. The subscriber application profile 300 for various subscribers may be stored in the data aggregator 240 according to an exemplary embodiment. As shown in FIG. 3, the subscriber application profile includes application descriptions 310 and destination IP addresses 320 indicating the servers that host the applications. When a request for application services is received, the data aggregator 240 determines the destination IP address included in the request, indicating the server hosting the application for performing the application services. The data aggregator 240 aggregates requests for application services for the same servers based on the destination IP addresses and routes the requests to the servers as appropriate.

According to an exemplary embodiment, the subscriber application profiles contained in the aggregator 240 may be modified by subscribers (or other authorized users) using, e.g., web portals, wireless devices, or the like. For example, to add an application, a subscriber (or another authorized user) may enter a destination IP address for a server hosting an application performing application services desired by the subscriber. Alternatively, the subscriber may simply indicate a desired application, and the destination internet protocol address may be generated, e.g., by client software. To delete an application, a subscriber may simply select an application in the subscriber application profile and delete it. Vendors providing application services may be modified in a similar manner.

FIG. 4 schematically illustrates an exemplary communications network 400. The communications network 400 includes two radio access networks (RANs). A first RAN, illustrated in the upper left hand portion of FIG. 4, is dedicated to GSM-based network access. A second RAN, illustrated in the lower left hand portion of FIG. 4, is dedicated to UMTS-based network access. The innovative aspects of the present disclosure may be implemented in alternative networks that use other access technologies, as described above. The first RAN is now described.

Subscriber devices, represented in FIG. 4 with reference numerals 402 and 404, are in communication with a Base Transceiver Station (BTS) 406 via the Um radio (air) interface. The BTSs 406 are terminating nodes for the radio interface in the illustrated first RAN. Each BTS 406 includes one or more transceivers and is responsible for ciphering of the radio interface.

In the illustrated embodiment, the subscriber devices 402 and 404 represent devices, such as the subscriber devices 210a, 210b, and 210c. Also, the devices may include mobile devices and computers, such as laptops with integrated or external, removable GSM access cards. The mobile devices may include mobile equipment, such as, but not limited to, one or more of keyboards, screens, touch screens, multi-touch screens, radio transceivers, circuit boards, processors, memory, Subscriber Identity Modules (SIM), Universal SIMs (USIM), or Universal Integrated Circuit Card (UICC) that contain subscriber information to enable network access to the wireless telecommunications network 400, and the like.

Each BTS 406 is in communication with a Base Station Controller (BSC) 408 via the Abis interface. A BSC may have tens or even hundreds of BTSs under its control. The BSC 408 is configured to allocate radio resources to the subscriber devices 402, 404, administer frequencies, and control handovers between BTSs 406 (except in the case of an inter-Mobile Switching Center (MSC) handover in which case control is in part the responsibility of the MSC). One function of the BSC 408 is to act as a concentrator, so that many different low capacity connections to the BTS 406 become reduced to a smaller number of connections towards the MSC. Generally, this means that networks are often structured to have many BSCs 408 distributed into regions near the BTSs 406, which are in turn connected to large centralized MSC sites. Although illustrated as a distinct element, the functions provided by the BSC 408 may alternatively be incorporated in the BTS 406. The Abis interface is eliminated in such a configuration.

The BSC 408 is logically associated with a Packet Control Unit (PCU) 410 when GPRS capabilities are employed. The PCU 410 is configured to support radio related aspects of GPRS when connected to a GSM network. The PCU 410 is in communication with a Serving GPRS Support Node (SGSN) 412 via the Gb interface. The SGSN 412 records and tracks the location of each communication device (e.g., devices 402, 404) communicating via the wireless telecommunications network 400. The SGSN 412 also provides security functions and access control functions.

The BSC 408 is also in communication with an MSC 414 via an A interface. The MSC 414 is configured to function as a telecommunications switch. The MSC 414 is in communication with location databases, such as a Visiting Location Register (VLR) 416 and a Home Location Register (HLR) 417. The VLR 416 may be logically associated with the MSC 414 as illustrated or may be provided as a separate network element in communication with the MSC 414. The VLR 416 is a database configured to store all subscriber data that is required for call processing and mobility management for mobile subscribers that are currently located in an area controlled by the VLR 416.

The HLR 417 is in communication with the MSC 414 and VLR 416 via the D interface. The HLR 417 is a database configured to provide routing information for mobile terminated calls and various messaging communications. The HLR 417 is also configured to maintain subscriber data that is distributed to the relevant VLR (e.g., the VLR 416) or the SGSN 412 through an attach process and to provide mobility management procedures, such as location area and routing area updates. The HLR 417 may be logically associated with an Authentication Center (AuC) as illustrated or may be provided as a separate network element in communication with the HLR 417.

The AuC is configured to authenticate each UICC/SIM/USIM that attempts to connect to the wireless telecommunications network 400, for example, when a subscriber device is powered on. Once authenticated, the HLR 417 is allowed to manage the UICC/SIM/USIM and services provided to the subscriber devices 402, 404. The AuC also is capable of generating an encryption key that is used to encrypt all wireless communications between the subscriber devices 402, 404 and the communications network 400.

The MSC 414 is also in communication with a Gateway MSC (GMSC) 418 via the B interface. The GMSC 418 is configured to provide an edge function within a Public Land Mobile Network (PLMN). The GMSC 418 terminates signaling and traffic from a Public Switched Telephone Network (PSTN) 422 and an Integrated Service Digital Network (ISDN) 424, and converts the signaling and traffic to protocols employed by the mobile network. The GMSC 418 is in communication with the HLR/AuC 417 via the C interface to obtain routing information for mobile terminated calls originating from fixed network devices such as, for example, landline telephones that are in communication with the mobile network via the PSTN 422.

The MSC 414 is also in communication with an EIR (Equipment Identity Register) 428 via an F interface. The EIR 428 is a database that can be configured to identify subscriber devices that are permitted to access the wireless telecommunications network 400. An IMEI (International Mobile Equipment Identity) is a unique identifier that is allocated to each mobile device and is used to identify subscriber devices in the EIR 428. The IMEI includes a type approval code, a final assembly code, a serial number, and a spare digit. An IMEI is typically placed in the EIR 428 once its operation has been certified for the infrastructure of the network 400 in a laboratory or validation facility.

The SGSN 412 and the MSC 414 are also in communication with a gateway mobile location center (GMLC) 429 via an Lg interface. The GMLC 429 can communicate with the HLR/AUc 417 via an Lh interface to acquire routing information.

The EIR 428 and the HLR/AuC 417 are each in communication with the SGSN 412 via the Gf interface and the Gr interface, respectively. The SGSN 412, in turn, is in communication with a GGSN (Gateway GPRS Support Node) 430 via the Gn interface. The GGSN 430 is configured to provide an edge routing function within a GPRS network to external PDNs (Packet Data Networks) 432, such as the Internet and one or more intranets, for example. The GGSN 430 includes firewall and filtering functionality. The HLR/AuC 417 is in communication with the GGSN 430 via the Gc interface.

The GGSN 430, in turn, is in communication with an aggregator 240 via the Gi interface. The aggregator 240 aggregates requests from various subscriber devices 402, 404 and routes them to servers within a cloud computing network, including PDNs 432 via the Gj interfaces.

The SGSN 412 is also in communication with other PLMNs 434 via an external GGSN (not shown). The external GGSN provides access to the other PLMNs 434. The other PLMNs 434 may be, for example, a foreign network, such as, a wireless telecommunications network operated by another service provider or the same service provider.

The second RAN, illustrated in the lower left hand portion of FIG. 4, is dedicated to UMTS-based network access and is now described. Subscriber devices 436 and 438, which may be implemented with devices similar to devices 402 and 404, are each in communication with a Node B 440 via the Uu radio (air) interface. Generally, the subscriber devices 436, 438 perform similar functions in the UMTS network that the subscriber devices 402, 404 perform in the GSM network.

The Node B 440 is the terminating node for the radio interface in the second RAN. Each Node B 440 includes one or more transceivers for transmission and reception of data across the Uu radio interface. Each Node B 440 is configured to apply the codes to describe channels in a CDMA-based UMTS network.

Each Node B 440 is in communication with a Radio Network Controller (RNC) 442 via the Iub interface. The RNC 442 is configured to allocate radio resources to the subscriber devices 436, 438, administer frequencies, and control handovers between Node Bs 440 (and others not shown). Although illustrated as a distinct element, the RNC 442 functions may alternatively be located within the Node Bs 440. In this configuration the Iub interface is eliminated. Generally, the RNC 442 performs similar functions for the UMTS network that the BSC 408 performs for the GSM network.

The RNC 442 is in communication with the MSC 414 via an Iu-CS interface. The RNC 442 is also in communication with the SGSN 412 via an Iu-PS interface. The other network elements perform the same functions for the UMTS network as described above for the GSM network.

The communications network 400 also includes an IP Multimedia Subsystem (IMS) network 444. The IMS network 444 includes Call State Control Functions (CSCFs), such as, a Proxy-CSCF (P-CSCF), an Interrogating-CSCF (I-CSCF), and a Serving-CSCF (S-CSCF). A P-CSCF is the first contact point in the IMS network 444 for a subscriber device and routes incoming communications to the I-CSCF. The I-CSCF determines which S-CSCF is serving the communication and routes the communication to that S-CSCF, which performs registration, session control, and application interface functions. The P-CSCF and the I-CSCF are illustrated as a combined I/P-CSCF 446 and the S-CSCF 448 is illustrated as a stand-alone element. Other CSCF configurations are contemplated.

The IMS network 444 also includes a Home Subscriber Server (HSS) 450, which is a master user database that supports the IMS network 444 core network elements. The HSS 450 stores subscription-related information, such as subscriber account details and subscriber profiles, performs authentication and authorization of the user, and provides information about a subscriber's location and IP address. It is similar to the GSM HLR and AuC, described above as the combination HLR/AuC 417.

The IMS network 444 also includes a Media Gateway Control Function (MGCF) 452, which provides call control protocol conversions between the ISUP (ISDN User Part) protocol used by the PSTN 422 and the SIP (Session Initiation Protocol) used by the IMS network 444.

Referring back to the SGSN 412, it is shown that the SGSN 412 is in communication with a charging system 454 via a CAP interface. The GGSN 430 is also in communication with the charging system 454, via an Ro interface. The charging system 454, in turn, is in communication with a billing system 456.

Briefly, the charging system 454 is responsible for offline and online charging of subscriber accounts. The charging system 454 may be deployed to provide charging rule functions for prepaid and/or postpaid network platforms. The single charging system 454 is illustrated for simplicity.

However, separate charging systems are contemplated and may be utilized if desired by the operating service provider.

The billing system 456 is responsible for billing postpaid customers and handling payments received for service provisioned for both postpaid and prepaid accounts in the network 400. Like the charging system 454, the billing system 456 may alternatively be designed as two separate entities for postpaid and prepaid applications.

The SGSN 412 is also in communication with a Domain Name System (DNS) server 458 via an exemplary $X_0$ interface. The SGSN 412, the DNS server 458 and the GGSN 430 communicate with one another during a PDP context activation sequence.

The GGSN 430 is also in communication with an authentication server 460 via an exemplary $X_2$ interface, a Dynamic Host Configuration Protocol (DHCP) server 462 via an exemplary $X_1$ interface. The GGSN 430 authenticates GPRS subscription information with the authentication server 460. The authentication server 460 operates using the RADIUS protocol or the DIAMETER protocol to authenticate subscription information prior to allowing a requesting subscriber device to activate a PDP context. The authentication server 460 then notifies the GGSN 430 of the success/failure of the subscription authentication. Upon receiving notification of a successful authentication, the GGSN 430 communicates with the DHCP server 462 to retrieve a dynamic IP address for use in the PDP context.

Figure 5:
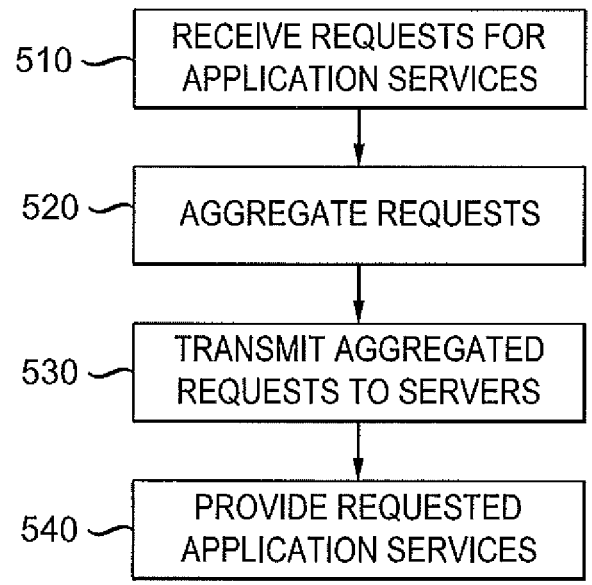
FIG. 5 illustrates a method for providing a plurality of application services according to an exemplary embodiment.

FIG. 5 illustrates a method for providing a plurality of application services in a cloud computing network according to an exemplary embodiment. At step 510, requests for a plurality of application services are received by an aggregator, e.g., aggregator 240, from at least one subscriber device, e.g., subscriber device 210*a*, via a customized private network connection. The requests include an APN pointing to the data aggregator 240 and one or more destination IP addresses for servers providing requested application services. The requests are routed to the data aggregator 240 based on the APN. At step 520, the destination IP address of each request, indicating the server for handling the requested application service, is determined by the data aggregator 240, and the aggregator aggregates the requests for application services from the subscriber device 210*a* with requests for application services from other subscriber devices, e.g., subscriber devices 210*b*, 210*c*. The requests may be aggregated based on the destination IP addresses included in the requests, such that requests for application services performed by applications hosted by the same server are aggregated. The aggregated requests may include requests for the same application services or requests for different application services that are performed by applications hosted by the same server. At step 530, the requests are transmitted to application servers, e.g., application servers 270*a*, 270*b*, and 270*c*, within the cloud computing network 250 hosting applications for performing the application services. At step 540, the application servers 270*a*, 270*b*, and 270*c* perform the requested application services, and the data aggregator 240 provides the performed services to the subscriber device that requested the application services via the customized private network connection.

Figure 6:
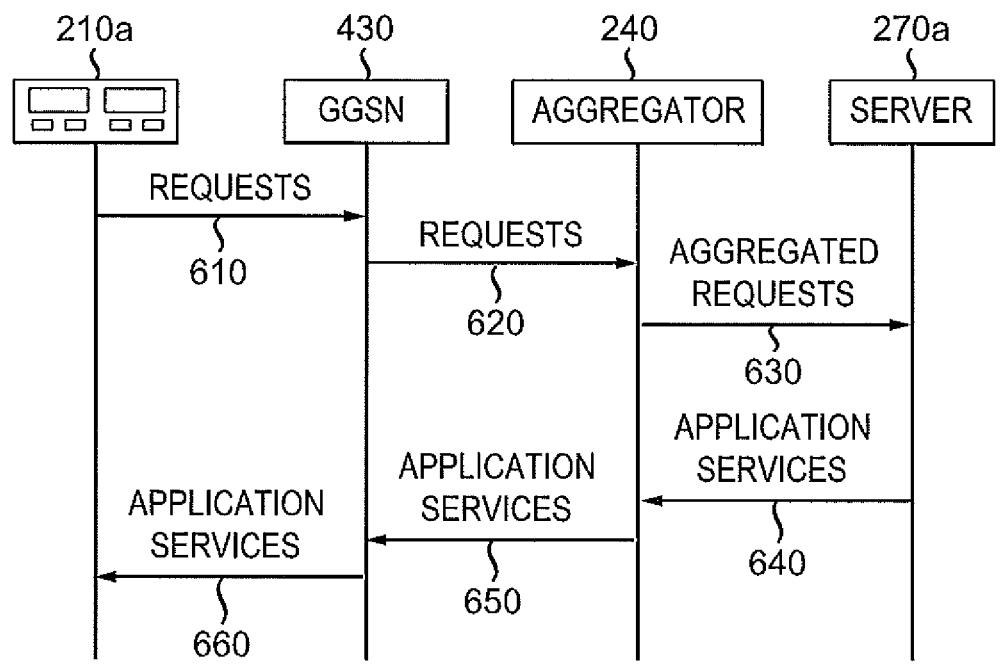
FIG. 6 illustrates a data flow diagram according to an exemplary embodiment.

FIG. 6 illustrates a data flow diagram according to an exemplary embodiment. Requests for application services are transmitted from a subscriber device, e.g., subscriber device 210*a*, at step 610. The requests are received at the GGSN 430 and routed to the aggregator 240 at step 620, based on the APN included in the requests. The aggregator 240 determines the servers that host the applications for performing the requested application services based on the destination IP addresses included in the requests and aggregates the requests from other subscriber devices for application services performed by applications hosted by the same server. Aggregated requests are sent to the server that hosts the applications for performing the requested application services, e.g., server 270*a*, at step 630. The server performs the requested application services and provides the application services to the aggregator 240 at step 640. At step 650, the aggregator provides the application services to the GGSN 430 which, in turn, provides the application services to the subscriber device 210*a* that requested the application services in step 660. The application services may be provided to the subscriber device 210*a* by the aggregator 240 and the GGSN 430 based on an IP address of the subscriber device 210*a* included in the original requests for application services.

Figure 7:
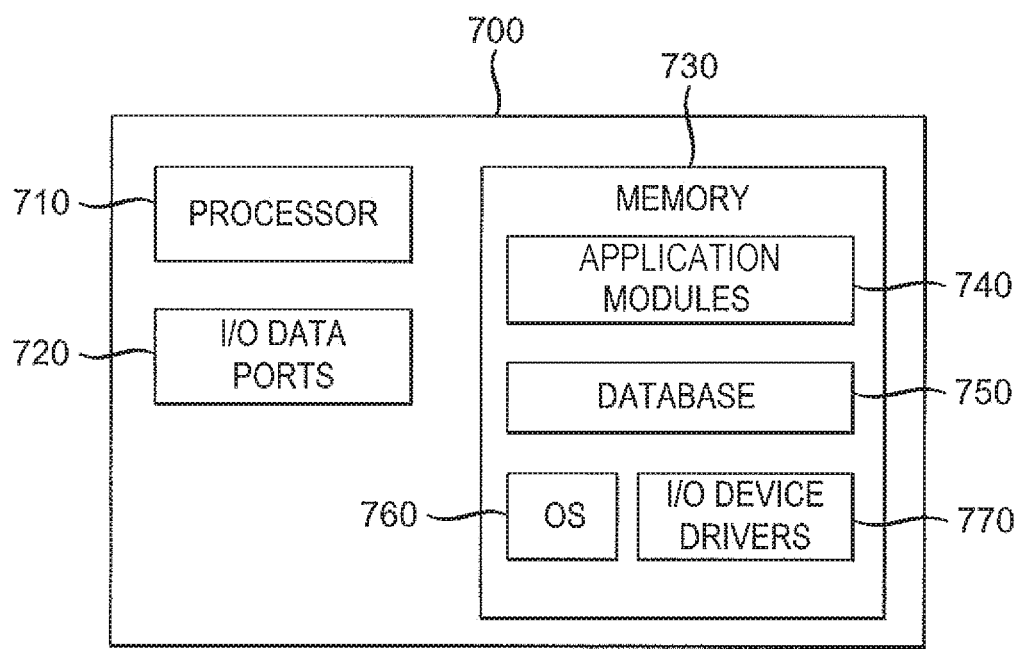
FIG. 7 illustrates a block diagram of a data aggregator according to an exemplary embodiment.

FIG. 7 is a block diagram of a device, such as the data aggregator 240, for providing a plurality of application services in a cloud computing network according to an exemplary embodiment. The device 700 includes a processor 710 that receives information, such as requests from subscriber devices 210*a*, 210*b*, and 210*c* via I/O Data Ports 720. The I/O Data Ports 720 can be implemented with, e.g., an interface including an antenna or other suitable type of transceiver through which data and signals may be transmitted and received. It should be appreciated that the I/O Data Ports 720 can be used for communications with the subscriber devices 210*a*, 210*b*, and 210*c*, via a wireless network, and the servers 270*a*, 270*b*, and 270*c*.

The processor 710 communicates with the memory 730 via, e.g., an address/data bus. The processor 710 can be any commercially available or customer microprocessor. The memory is 730 is representative of the overall hierarchy of memory devices containing the software and data used to implement the functionality of the device 700. The memory 730 can include but is not limited to the following types of devices: processor registers, processor cache, RAM, ROM, PROM, EPROM, EEPROM, flash memory, SRAMD, DRAM other volatile memory forms, and non-volatile, semi-permanent or permanent memory types; for example, tape-based media, optical media, solid state media, hard disks, combinations thereof, and the like.

As shown in FIG. 7, the memory 730 may include several categories of software and data used in the device 700, including, application modules 740, a database 750, an operating system (OS) 760, and the input/output (I/O) device drivers 770. As will be appreciated by those skilled in the art, the OS 760 may be any operating system for use with a data processing system. The I/O device drivers 770 may include various routines accessed through the OS 760 by the application modules 740 to communicate with devices, and certain memory components. The application modules 740 can be stored in the memory 730 and/or in a firmware (not shown) as executable instructions, and can be executed by the processor 710. The application modules 740 include various programs that, when executed by the processor 710, implement the various features of the device 700, including applications to apply to data stored in the database, along with data, e.g., requests from the subscriber devices 210*a*, 210*b*, and 210*c*, received via the I/O data ports 720. The application modules 740 may determine the destination IP addresses included in the requests from the subscriber devices 210*a*, 210*b*, and 210*c* and aggregate requests from the various subscriber devices based on the destination IP addresses.

The database 750 represents the static and dynamic data used by the application modules 740, the OS 760, the I/O device drivers 770 and other software programs that may reside in the memory 730. The database 750 may include, for example, subscriber application profiles for various subscriber devices. The subscriber application profiles may contain information indicating the applications subscribed to by the subscriber devices 210a, 210b, and 210c, and the destination IP addresses of the servers 270a, 270b, and 270c hosting the applications. This information may be modifiable, as described above.

While the memory 730 is illustrated as residing proximate the processor 710, it should be understood that at least a portion of the memory 730 can be a remotely accessed storage system, for example, a server on a communication network, a remote hard disk drive, a removable storage medium, combinations thereof, and the like. Thus, any of the data, application modules, and/or software described above can be stored within the memory 730 and/or accessed via network connections to other data processing systems (not shown) that may include a local area network (LAN), a metropolitan area network (MAN), or a wide area network (WAN), for example.

It should be understood that FIG. 7 and the description above are intended to provide a brief, general description of a suitable environment in which the various aspects of some embodiments of the present disclosure can be implemented. While the description refers to computer-readable instructions, the present disclosure also can be implemented in combination with other program modules and/or as a combination of hardware and software in addition to, or instead of, computer readable instructions. The terminology "application module," or variants thereof, is used expansively herein to include routines, program modules, programs, components, data structures, algorithms, and the like. Application modules can be implemented on various system configurations, including single-processor or multiprocessor systems, minicomputers, mainframe computers, personal computers, hand-held computing devices, microprocessor-based, programmable consumer electronics, combinations thereof, and the like.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method comprising:
receiving, by a data aggregator comprising a processor, via a first private network connection assigned to a first communication device, a first plurality of requests from the first communication device, the first plurality of requests comprising a first request for a first application service provided by a first application hosted by a first application server and a second request for a second application service provided by a second application hosted by a second application server, wherein the first application service and the second application service are different, wherein the first request includes an access point name identifying the data aggregator and also includes a destination address identifying the first application server, wherein the second request includes the access point name identifying the data aggregator and also includes a destination address identifying the second application server, wherein the access point name identifying the data aggregator included in the first request causes the first request to be routed initially to the data aggregator instead of the first application server, and wherein the access point name identifying the data aggregator included in the second request causes the second request to be routed initially to the data aggregator instead of the second application server;

receiving, by the data aggregator, via a second private network connection assigned to a second communication device, a second plurality of requests from the second communication device, the second plurality of requests comprising a third request for a third application service provided by a third application hosted by the first application server and a fourth request for a fourth application service provided by a fourth application hosted by the second application server, wherein the third application service and the fourth application service are different, wherein the third request includes the access point name identifying the data aggregator and also includes the destination address identifying the first application server, wherein the fourth request includes the access point name identifying the data aggregator and the destination address identifying the second application server, wherein the access point name identifying the data aggregator included in the third request causes the third request to be routed initially to the data aggregator instead of the first application server, and wherein the access point name identifying the data aggregator included in the fourth request causes the third request to be routed initially to the data aggregator instead of the second application server;

aggregating, by the data aggregator, the first request received from the first communication device with the third request received from the second communication device to form first aggregated requests based on both the first application service and the third application service being provided by applications hosted by the first application server;

aggregating, by the data aggregator, the second request received from the first communication device with the fourth request received from the second communication device to form second aggregated requests based on both the second application service and the fourth application service being provided by applications hosted by the second application server;

initiating, by the data aggregator, transmission of the first aggregated requests to the first application server hosting both the first application and the third application for performing the first application service for the first communication device and the third application service for the second communication device; and initiating, by the data aggregator, transmission of the second aggregated requests to the second application server hosting both the second application and the fourth application for performing the second application service for the first communication device and the fourth application service for the second communication device.

2. The method of claim 1, wherein the destination address identifying the first application server comprises a first destination internet protocol address of the first application server, wherein the destination address identifying the second application server comprises a second destination internet protocol address of the second application server, and wherein the method further comprises:

using the first destination internet protocol address of the first application server provided in the first request and the third request to determine to aggregate the first request with the third request; and using the second destination internet protocol address of the second application server provided in the second request and the fourth request to determine to aggregate the second request with the fourth request.

3. The method of claim 2, wherein transmission of the first aggregated requests to the first application server is based on the first destination internet protocol address included in each of the first request and the third request and wherein transmission of the second aggregated requests to the second application server is based on the second destination internet protocol address included in each of the second request and the fourth request.

4. The method of claim 2, wherein:

the first request and the third request each further comprise a first header, the first header comprising the first destination internet protocol address of the first application server; and the second request and the fourth request each further comprise a second header, the second header comprising the second destination internet protocol address of the second application server.

5. The method of claim 1, wherein the first private network connection and the second private network connection are wireless connections.

6. The method of claim 1, further comprising:

receiving a request from the first communication device to modify application services provided to the first communication device; and modifying a communication device profile for the first communication device to reflect a modification in the application services provided to the first communication device.

7. The method of claim 1, wherein the first plurality of requests and the second plurality of requests received by the data aggregator are routed to the data aggregator by a gateway node based on the access point name identifying the data aggregator being included in each of the first request, the second request, the third request, and the fourth request.

8. The method of claim 1, further comprising:

providing, by the data aggregator, via the first private network connection, the first application service provided by the first application hosted by the first application server and the second application service provided by the second application hosted by the second application server to the first communication device, in response to the first plurality of requests; and providing, by the data aggregator, via the second private network connection, the third application service provided by the third application hosted by the first application server and the fourth application service provided by the fourth application hosted by the second application server to the second communication device, in response to the second plurality of requests.

9. A data aggregator comprising:

a processor;

an interface; and a memory that stores computer readable instructions which, when executed by the processor, cause the processor to perform operations comprising:

receiving, via a first private network connection assigned to a first communication device, a first plurality of requests from the first communication device, the first plurality of requests comprising a first request for a first application service provided by a first application hosted by a first application server and a second request for a second application service provided by a second application hosted by a second application server, wherein the first application service and the second application service are different, wherein the first request includes an access point name identifying the data aggregator and also includes a destination address identifying the first application server, wherein the second request includes the access point name identifying the data aggregator and also includes a destination address identifying the second application server, wherein the access point name identifying the data aggregator included in the first request causes the first request to be routed initially to the data aggregator instead of the first application server, and wherein the access point name identifying the data aggregator included in the second request causes the second request to be routed initially to the data aggregator instead of the second application server, receiving, via a second private network connection assigned to a second communication device, a second plurality of requests from the second communication device, the second plurality of requests comprising a third request for a third application service provided by a third application hosted by the first application server and a fourth request for a fourth application service provided by a fourth application hosted by the second application server, wherein the third application service and the fourth application service are different, wherein the third request includes the access point name identifying the data aggregator and also includes the destination address identifying the first application server, wherein the fourth request includes the access point name identifying the data aggregator and also includes the destination address identifying the second application server, wherein the access point name identifying the data aggregator in the third request causes the third request to be routed initially to the data aggregator instead of the first application server, and wherein the access point name identifying the data aggregator in the fourth request causes the fourth request to be routed initially to the data aggregator instead of the second application server, aggregating the first request received from the first communication device with the third request received from the second communication device to form first aggregated requests based on both the first application service and the third application service being provided by applications hosted by the first application server, aggregating the second request received from the first communication device with the fourth request received from the second communication device to form second aggregated requests based on both the second application service and the fourth application service being provided by applications hosted by the second application server, initiating transmission, via the interface, of the first aggregated requests to the first application server hosting both the first application and the third application for performing the first application service for the first communication device and the third application service for the second communication device, and initiating transmission, via the interface, of the second aggregated requests to the second application server hosting both the second application and the fourth application for performing the second application service for the first communication device and the fourth application service for the second communication device.

10. The data aggregator of claim 9, wherein the destination address identifying the first application server comprises a first destination internet protocol address of the first application server, wherein the destination address identifying the second application server comprises a second destination internet protocol address of the second application server, and wherein the operations further comprise:

using the first destination internet protocol address of the first application server provided in the first request and the third request to determine to aggregate the first request with the third request; and using the second destination internet protocol address of the second application server provided in the second request and the fourth request to determine to aggregate the second request with the fourth request.

11. The data aggregator of claim 10, wherein transmission of the first aggregated requests to the first application server is based on the first destination internet protocol address included in each of the first request and the third request and wherein transmission of the second aggregated requests to the second application server is based on the second destination internet protocol address included in each of the second request and the fourth request, and wherein the first plurality of requests and the second plurality of requests received by the data aggregator are routed to the data aggregator by a gateway node based on the access point name identifying the data aggregator being included in each of the first request, the second request, the third request, and the fourth request.

12. The data aggregator of claim 10, wherein:

the first request and the third request each further comprise a first header, the first header comprising the first destination internet protocol address of the first application server; and the second request and the fourth request each further comprise a second header, the second header comprising the second destination internet protocol address of the second application server.

13. The data aggregator of claim 9, wherein the memory further stores a communication device profile for the first communication device and wherein the operations further comprise:

receiving a request from the first communication device to modify application services provided to the first communication device; and modifying the communication device profile stored in the memory to reflect a modification in the application services provided to the first communication device.

14. A non-transitory computer readable storage device containing instructions which, when executed by a processor of a data aggregator, cause the processor to perform operations comprising:

receiving, via a first private network connection assigned to a first communication device, a first plurality of requests from the first communication device, the first plurality of requests comprising a first request for a first application service provided by a first application hosted by a first application server and a second request for a second application service provided by a second application hosted by a second application server, wherein the first application service and the second application service are different, wherein the first request includes an access point name identifying the data aggregator and also includes a destination address identifying the first application server, wherein the second request includes the access point name identifying the data aggregator and also includes a destination address identifying the second application server, wherein the access point name identifying the data aggregator in the first request causes the first request to be routed initially to the data aggregator instead of the first application server, and wherein the access point name identifying the data aggregator in the second request causes the second request to be routed initially to the data aggregator instead of the second application server;

receiving, via a second private network connection assigned to a second communication device, a second plurality of requests from the second communication device, the second plurality of requests comprising a third request for a third application service provided by a third application hosted by the first application server and a fourth request for a fourth application service provided by a fourth application hosted by the second application server, wherein the third application service and the fourth application service are different, wherein the third request includes the access point name identifying the data aggregator and also includes the destination address identifying the first application server, wherein the fourth request includes the access point name identifying the data aggregator and also includes the destination address identifying the second application server, wherein the access point name identifying the data aggregator in the third request causes the third request to be routed initially to the data aggregator instead of the first application server, and wherein the access point name identifying the data aggregator in the fourth request causes the fourth request to be routed initially to the data aggregator instead of the second application server;

aggregating the first request received from the first communication device with the third request received from the second communication device to form first aggregated requests based on both the first application service and the third application service being provided by applications hosted by the first application server;

aggregating the second request received from the first communication device with the fourth request received from the second communication device to form second aggregated requests based on both the second application service and the fourth application service being provided by applications hosted by the second application server;

initiating transmission of the first aggregated requests to the first application server hosting both the first application and the third application for performing the first application service for the first communication device and the third application service for the second communication device; and initiating transmission of the second aggregated requests to the second application server hosting both the second application and the fourth application for performing the second application service for the first communication device and the fourth application service for the second communication device.

15. The non-transitory computer readable storage device of claim 14, wherein the destination address identifying the first application server comprises a first destination internet protocol address of the first application server, wherein the destination address identifying the second application server comprises a second destination internet protocol address of the second application server, and wherein the operations further comprise:

using the first destination internet protocol address of the first application server provided in the first request and the third request to determine to aggregate the first request with the third request; and using the second destination internet protocol address of the second application server provided in the second request and the fourth request to determine to aggregate the second request with the fourth request.

16. The non-transitory computer readable storage device of claim 15, wherein transmission of the first aggregated requests to the first application server is based on the first destination internet protocol address included in each of the first request and the third request and wherein transmission of the second aggregated requests to the second application server is based on the second destination internet protocol address included in each of the second request and the fourth request, and wherein the first plurality of requests and the second plurality of requests received by the data aggregator are routed to the data aggregator by a gateway node based on the access point name identifying the data aggregator being included in each of the first request, the second request, the third request, and the fourth request.

17. The non-transitory computer readable storage device of claim 15, wherein:

the first request and the third request each further comprise a first header, the first header comprising the first destination internet protocol address of the first application server; and the second request and the fourth request each further comprise a second header, the second header comprising the second destination internet protocol address of the second application server.

18. The non-transitory computer readable storage device of claim 14, wherein the first private network connection and the second private network connection are wireless connections.

19. The non-transitory computer readable storage device of claim 14, wherein the operations further comprise:

receiving a request from the first communication device to modify application services provided to the first communication device; and modifying a communication device profile for the first communication device to reflect a modification in the application services provided to the first communication device.

20. The non-transitory computer readable storage device of claim 14, wherein the operations further comprise:

providing, to the first communication device, via the first private network connection, the first application service provided by the first application hosted by the first application server and the second application service provided by the second application hosted by the second application server, in response to the first plurality of requests; and providing, to the second communication device, via the second private network connection, the third application service provided by the third application hosted by the first application server and the fourth application service provided by the fourth application hosted by the second application server to the second communication device, in response to the second plurality of requests.

* * * * *